Patented Jan. 18, 1944

2,339,623

UNITED STATES PATENT OFFICE 2,339,623

CONDENSATION PRODUCT OF ALDEHYDES AND CARBAMIDOMETHYLAMINO TRIAZINES AND METHOD OF PREPARING THE SAME

Gaetano F. D'Alelio, Pittsfield, Mass., assignor to General Electric Company, a corporation of New York No Drawing. Application December 3, 1941, Serial No. 421,493

12 Claims. (Cl. 260—69)

This invention relates to new condensation products and to method of making the same. Generally, it is concerned with resinous compositions prepared from novel compounds containing imino, amino, imido, and amido groups. Specifically, it is concerned with, and has as its principal object the preparation of, resinous compositions obtained as condensation products of ingredients comprising an aldehyde and certain novel substituted or unsubstituted carbamidomethyl derivatives of 2,4,6-triamino 1,3,5 triazines having the general structural formula

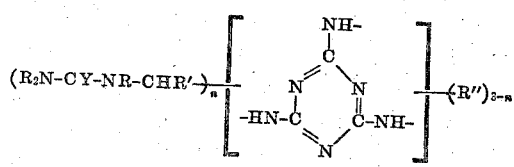

in which Y represents oxygen or sulphur, at least one R represents hydrogen and the other (R)s represent hydrogen, a monovalent hydrocarbon radical or a monovalent halogenohydrocarbon radical, R' represents hydrogen or a monovalent aliphatic, carbocyclic or aromatic hydrocarbon radical of not more than six carbon atoms and R'' represents hydrogen or any monovalent hydrocarbon radical, whether saturated or unsaturated, substituted or unsubstituted, aliphatic carbocyclic, aryl, or heterocyclic, mono- or polynuclear, etc., and $n$ is an integer and is at least 1 and not more than 3. Examples of suitable hydrocarbon radicals represented by R and R'' are aliphatic (e. g. methyl, ethyl, propyl, isopropyl, butyl, secondary butyl, butenyl, amyl, hexyl, allyl, etc.); including cycloaliphatic (e. g. cyclopentyl, cyclopentenyl, cyclohexyl, cyclohexenyl, cycloheptyl, etc.); aryl (e. g. phenyl, diphenyl, naphthyl, etc.); aliphatic substituted aryl ( e. g. tolyl, xylyl, ethylphenyl, propylphenyl, isopropylphenyl, allylphenyl, etc.); aryl substituted aliphatic (e. g. benzyl, phenylallyl, phenylpropyl, etc.); and their homologues, as well as those groups with one or more of their hydrogen atoms substituted by a halogen. Specific examples of halogeno-substituted hydrocarbon radicals are chlormethyl, chlorcyclohexyl, chlorphenyl, dichlorphenyl, ethyl chlorphenyl, phenyl chlorethyl, bromethyl, bromtolyl, etc. Preferably R, R' and R'' in the above formula are hydrogen.

The novel substituted or unsubstituted carbamidomethyl derivatives of 2,4,6-triamino 1,3,5-triazine represented by the above formula may be prepared by reacting, at room temperature, a concentrated aqueous solution of a substituted or unsubstituted mono-carbinol urea or thiourea of the formula

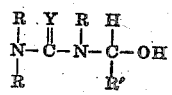

wherein R, R' and Y represent the various groups hereinbefore indicated, with a concentrated aqueous solution of a 2,4,6-triamino 1,3,5 triazine containing sufficient hydrogens on each of the amino groups that after reaction with the monocarbinol urea each of the amino groups will contain at least one reactive hydrogen. The mol ratio in which the two reactants are mixed will depend upon the desired product. Thus, for example, when they are mixed in a mol ratio of 1:1, the reaction product is a monocarbamidomethyl derivative of the formula

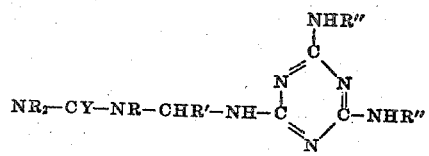

wherein R, R', R'', and Y represent the groups above indicated.

As a more specific example of the preparation of my novel starting materials, a cold concentrated solution of 2 mols of an unsubstituted mono-methylol urea reacts with a cold concentrated solution of 1 mol of 2,4,6-triamino 1,3,5-triazine to form the di-carbamidomethyl derivative having the formula

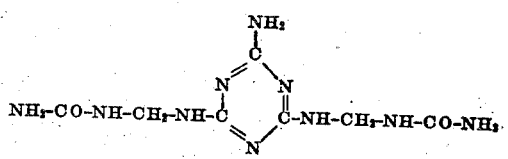

Examples of monocarbinol ureas, other than monomethylol urea, which may be used are: methylol thiourea, methylcarbinol urea and thiourea, ethylcarbinol urea and thiourea, propylcarbinol urea and thiourea, methylol phenyl ureas and thioureas, methylol allyl ureas and thioureas, methylol diphenyl ureas and thioureas, etc.

Examples of substituted 2,4,6-triamino 1,3,5-triazines which may be used in the preparation of all or some of my reactive derivatives are the mono-, di- or tri-alkyl or aryl-melamines, such as 2,4,6-tri-(ethylamino) 1,3,5-triazine, 2,4,6-tri-(phenylamino) 1,3,5-triazine, 2-ethylamino 4,6-diamino 1,3,5-triazine, 2-amino 4,6-di-(phenylamino) 1,3,5-triazine, etc.

Preferably the concentrated solutions of the two reactants are mixed and held at room temperature during the reaction. The products of the reaction may be recovered by evaporation of the water at or below room temperature under atmospheric or subatmospheric pressures. Alternatively, the product may be recovered by adding to the aqueous solution of the reaction product a suitable water-miscible precipitant for the reaction product, which precipitant is incapable of reacting with the desired product at operating temperatures.

The resulting compounds may be resinified by reaction with aldehydes or aldye engendering substances, preferably under the influence of heat, the unsubstituted derivatives obtained by reacting 1, 2, or 3 mols of monomethylolurea or thiourea with 1 mol of 2,4,6-triamino 1,3,5-triazine being most easily resinified under such conditions. The relative ease of resinification decreases with increased replacement of the various substitutable hydrogens by hydrocarbon radicals. Resinification may be accomplished by heating the reactants alone, in inert mediums, or in inert solvents such as water. Resinification may be accelerated by the addition or presence of basic materials, acidic materials, neutral, acid, or alkaline salts. Reactive media may likewise be used to achieve resinification as hereinafter shown.

This novel class of organic compounds may be mixed with resin intermediates containing carbinol (—CR$_2$OH) groups, such as monomethylol ureas, dimethylol ureas, phenol methylols, the methylols of cyclic amidines, e. g. methytlol melamines, methylol guanazoles, etc.; then co- or inter-resinified alone or in the presence of other modifying bodies to give intercondensed resins.

The novel compounds of this invention, particularly the highly substituted compounds, may be used as plasticizers for many resins. In many cases they themselves become resinous during the plasticizing process, while in other cases they condense with the other resinous intermediate during manufacturing operations. Specifically, these materials may be used (1) unconverted as plasticizers, (2) partly or completely converted as plasticizers, (3) partly or completely inter-condensed to exert a plasticizing effect. The final and intermediate resins prepared from the novel materials of this invention alone or with the modifications expressed herein are extremely compatible with many other natural or synthetic resins in their intermediate or ultimate stages.

Before, during, or after the resinification process, the reaction between the aldehyde or mixture of aldehydes and the novel compounds of this invention may be modified by the presence of suitable amounts of a large class of compounds, for example, hydroxy compounds, e. g. methyl, ethyl, propyl, isopropyl, butyl, amyl, tertiary amyl, benzyl, furfuryl, tetrahydrofurfuryl, cyclohexyl, phenethyl, naphthyl, polyvinyl, allyl, methallyl, crotyl, 1-chlorallyl, propargyl, 2-chlorallyl, cinnamyl, alcohols, etc., glycol, diethylene glycol, triethylene glycol, polyethylene oxide, glycerine, pentaerythritol, saligenin, phenol, cresol, xylenol, resorcinol, catechol, pyrogallol, etc., chlorohydrin, epichlorohydrin, nitrobutanol, diacetone alcohol, ethylene oxide, propylene oxide, etc., ammonia and its amino, amido, or imino compounds, e. g. methylamine, dimethylamine, hydroxylamine, hydrazine, phenyl hydrazine, diamylamine, stearyl amine, cyclohexyl amine, aniline, di-phenylamine, diaminobenzene, triaminobenzene, aminophenol, nitro aniline, piperazine, ethanolamine, di-isopropanolamine, triethanolamine, propanolamine, ethylene diamine, formamide, acetamide, propionamide, lauramide, acrylic amide, methacrylic amide, atropic amide, malonic diamide, itaconic diamide, succinic diamide, citraconic triamide, benzamide, phthalic diamide, phthalimide, benzosulfimide, aminobenzene sulfonamide, benzene disulfonamide, benzene trisulfonamide, anthranilic esters, anthranilamide, salicylamide, para-phenyl benzene sulfonamide, tolyl amide, etc.; the amino 1,3,5-triazines, e. g. 2,4,6-triamino 1,3,5-triazine, 2-amino 1,3,5-triazine, 2,4-diamino 1,3,5-triazine; the diazines, e. g. 2,4,6-triaminopyrimidine the diamino pyrimidine thio ethers; the amino 1,2,4-triazones, e. g. guanazole, phenyl guanazole, dihydrazino 1,2,4-pyrrodiazole, guanazo-guanazole, imidurazo-guanazole, the amino 1,2-diazoles, e. g. 3,5-diaminopyrazole, the urea type compounds, e. g. urea, methyl-urea, monomethylol urea, phenyl urea, thiourea, phenyl thiourea, unsymmetrical diphenyl urea, unsymmetrical ethyl phenyl urea, hydroxy urea, ethanol urea, unsymmetrical diethanol urea, guanidine, aminoguanidine, biguanidine, di-cyandiamide, guanyl urea, guanyl thiourea, the proteins e. g. casein, soya bean protein, alfalfa protein, gelatin, coffee bean protein, alkyd resins having free hydroxyl groups such as glyceryl phthalate, oil-modified glyceryl phthalate, diethylene glycol succinate, triethylene glycol maleate, glyceryl maleate, etc.; nitriles, e. g., acetonitrile, propionitrile, butyronitrile, benzonitrile, acrylonitrile, methacrylonitrile, atropic nitrile, ethylene cyanohydrin, acetone cyanohydrin, aminoisobutyronitrile, aminoacetonitrile, etc.; esters such as lactic esters, hydroxy isobutyric esters, acetoacetic ester, malonic esters, etc.

The final and intermediate resins and condensation products prepared from the novel materials of this invention alone or with the modifications already expressed are extremely compatible with many other natural or synthetic resins in their intermediate or ultimate stages.

This novel class of compounds, when reacted with aldehydes, alone or with modifications, will form self-curing aminoplasts by condensation with curing reactants, such as chloroacetonitrile, nitrourea, glycine, aminopropanol hydrochloride, mono-, di- or tri-chloroacetamides, alpha, beta-dibromopropionitrile, alpha, beta-dichloropropionitrile, alpha-methyl, alpha, beta-dichloropropionitrile, amino-acetamide hydrochloride, ethylene diamine monohydrochloride, sulfamic acid, chloroacetyl urea, citric diamide, phenacyl chloride and others mentioned, for example in my copending applications Serial No. 346,962, filed July 23, 1940, and Serial No. 354,395, filed August 27, 1940, both of which applications are assigned to the same assignee as the present invention.

The initial reaction leading to the formation of the new condensation products of ingredients comprising an aldehyde and my novel compounds may be carried out at normal or at elevated temperatures, at atmospheric or superatmospheric pressures, and in the presence or absence of an acid or of an alkaline condensing agent which may be either a direct catalyst or a reactant catalyst. A catalytic reactant or reactant catalyst is defined as a substance which accelerates the reaction between the aldehyde and the aldehyde reactable component or components while it itself becomes an integral part of the condensation product. Preferably the reaction between the components is started under alkaline conditions.

Examples of other substances yielding alkaline aqueous solutions may be used in obtaining alkaline conditions for the initial condensation reaction are alkalis such as sodium, potassium and calcium hydroxides, sodium and potassium carbonates, mono-, di- and tri-amines, etc. Best results are obtained by causing the condensation reaction between the primary components to take place in the presence of a primary condensation catalyst and a secondary condensation catalyst. To obtain condensation products having optimum time- or storage-stability characteristics, I have found that the primary catalyst should be a member of the class consisting of (1) nitrogen-containing basic tertiary compounds that are aldehyde-non-reactable, e. g. tertiary amines such as trialkyl (for example, trimethyl, triethyl, etc.) amines, triaryl (for example, triphenyl, etc.) amines, etc., and (2) nitrogen-containing basic compounds that are aldehyde-reactable, for instance ammonia, primary amines, (e. g., ethyl amine, propyl amine, etc.) and secondary amines (e. g. dipropyl amine, dibutyl amine, etc.) Catalytic reactants that may be used include substances such as tri-carbamidomethyl amine N(CH$_2$NHCONH$_2$)$_3$ or other substituted or unsubstituted mono-, di- or tri-carbamidomethyl amines or substituted or unsubstituted mono-, di- or tri-(mono-carbinol-ureidomethyl) amines such as are disclosed in my copending applications Serial No. 409,017 to 409,022, inclusive, filed Aug. 30, 1941, and assigned to the same assignee as the present invention.

The secondary condensation catalyst, which ordinarily is used in an amount less than the amount of primary catalyst, should be a fixed alkali, for instance a carbonate, cyanide or hydroxide of an alkali metal (e. g. sodium, potassium, lithium, etc.).

Various ways may be employed for effecting initial reaction between the components. For example, I may first mix all the reactants and effect condensation between the mixed reactants in the presence or absence of addition agents, for instance condensation catalysts, fillers, other natural or synthetic resinous bodies, solvents, diluents, etc. Alternatively, I may first condense either my compound, or some other aldehyde reactable material such as a urea, a phenol, a melamine or the like, with a suitable aldehyde and thereafter at any stage of the original reaction, I may add the remaining aldehyde-reactable ingredient or ingredients. Or I may condense or partially condense my novel compounds with an aldehyde, add the resulting product to a urea-aldehyde, a phenol-aldehyde, or some other partial condensation product of an aldehyde and an aldehyde-reactable body and then cause the reaction to proceed further. Still other ways may be employed in combining the components in producing the modified or unmodified products of this invention, as will readily be understood by those skilled in the art from the following examples covering the preparation of resinous products from the mono-, di- and tri-carbamidomethyl derivatives of melamine, which derivatives, for brevity, will be designated respectively as the mono-derivative, di-derivative or tri-derivative.

*Example 1*

|  | Mol ratio (approximate) | Parts by weight |
|---|---|---|
| Aqueous mono-derivative (57% concentration) | 1 | 122.5 |
| Aqueous formaldehyde | 3 | 84.8 |

The aqueous formaldehyde used in this and the following examples contained approximately 37.5 per cent CH$_2$O. The mono-derivative and the formaldehyde solution were mixed and refluxed at the boiling temperature of the mass for 15 minutes to produce a syrup which was clear while hot but which precipitated on cooling to room temperature. The syrup had a pH of 7.5 and its cure on a hot plate at 135° C. was comparatively slow. The addition of small amounts (about 0.5 per cent) of curing agents such as chloroacemide or alpha, beta-dichloropropionitrile greatly accelerated the cure. A molding compound made by mixing 150 parts by weight of the syrup with 51 parts by weight of alpha flock and drying the mixture at 70° C. had good flow and an excellent cure when molded for 5 minutes at 135° C. under a pressure of 6,000 pounds per square inch. The molded piece was light colored and had a shiny surface.

*Example 2*

|  | Mol ratio (approximate) | Parts by weight |
|---|---|---|
| Aqueous di-derivative (66% concentration) | 1 | 75.7 |
| Formaldehyde | 5 | 74.2 | were refluxed for 15 minutes to produce a syrup which was clear while hot but which precipitated out on cooling to room temperature. The syrup had a pH of 7.25 and had a good cure at 135° C., which cure was accelerated by the addition of small amounts of chloroacetamide. A molding compound prepared in the manner set forth in Example 1 from 100 parts by weight of resin syrup and 32 parts of alpha flock exhibited excellent moldability and good flow. The molded product resembled that obtained in Example 1.

*Example 3*

|  | Mol ratio (approximate) | Parts by weight |
|---|---|---|
| Aqueous tri-derivative (68.5% concentration) | 1 | 73.0 |
| Aqueous formaldehyde | 7 | 81.8 | were refluxed for 15 minutes to obtain a syrup which was clear both at elevated and room temperatures. It had a pH of 6.6. It had a good cure alone when tested at 135° C. With small additions of alpha, beta-dichloropropionitrile, it had an excellent cure, curing quickly to a hard state. Molding compounds prepared as in Example 1 from 140 parts syrup and 50 parts by weight of alpha flock had excellent flow and cure characteristics and the molded products were comparable with those obtained in the previous examples.

Example 4

Using the same procedure and proportions as in Example 1, the same reactants were heated together with an aqueous solution of 0.01 mol (0.14 part) sodium hydroxide. The syrupy product was clear both at elevated and room temperatures and contained about 42 per cent resin solids. It had a pH about one point higher than the pH of the syrup of Example 1. The syrup did not cure alone at 135° C., but had an excellent, prolonged cure when modified by the addition of a small amount of chloroacetamide or alpha, beta-dibromopropionitrile. When the syrup was added to a liquid phenol-formaldehyderesin freed of catalyzing bases and salts as a modifier therefor in the proportion of 1 part syrup to 9 parts varnish (based on the resin solid contents of the respective materials) the product had a stroke cure time at 150° C. of 80 seconds as compared with 108 seconds for the unmodified varnish.

Comparable results were obtained with sodium hydroxide-catalyzed di- and tri- derivative resins in which the proportions of the reactants were the same as in Examples 2 and 3. The rate of cure of the di- and tri- derivatives, both alone and with curing accelerators, increased progressively with the increase in the number of carbamidomethyl groups on the melamine nucleus. These resin syrups also had similar effects as modifiers for the above-mentioned synthetic liquid phenolic resin.

Example 5

Resin syrups were prepared from the mono-, di- and tri-derivatives as in Example 4, using catalyst mixtures consisting of 0.01 mol sodium hydroxide and 0.12 mol ammonia (aqueous solution). The syrup obtained from mono-derivative had a very slow cure while the syrup obtained from the tri-derivative cured faster and had an excellent cure with chloroacetamide. Molding compounds were prepared from the three syrups using 55 parts syrup (based on the solids content thereof), 45 parts alpha flock and 1 part chloroacetamide. All three compounds exhibited good flow and excellent cure. The molded products were light-colored and possessed hard, shiny surfaces.

Example 6

|  | Mol ratio (approx.) | Parts by weight |
|---|---|---|
| Aqueous mono-derivative (57% concentration) | 1 | 63.7 |
| Acrolein | 3 | 29.6 |

On mixing of the acrolein and melamine mono-derivative, a violent reaction occurred and the batch turned to a light yellow paste. At 135° C., this paste melted to a clear resin which was self-curing with a prolonged cure time.

The reaction between 1 mol of the di-derivative and 5 mols acrolein was less violent. However, when the mixture was brought to reflux, a vigorous reaction did take place and the syrup turned deep yellow and changed to a gel which was clear when melted and was self-curing at 135° C.

Example 7

|  | Mol ratio (approx.) | Parts by weight |
|---|---|---|
| Aqueous tri-derivative (68% concentration) | 1 | 70 |
| Acrolein | 7 | 58.3 |
| NaOH (in 2 parts water) | 0.005 | 0.03 |

On the addition of the caustic to a mixture of the tri-derivative and the acrolein, a violent reaction occurred and the syrup turned to a clear, yellow, thick mass. A sample of this mass melted when placed on the hot plate at 135° C. and was slowly self-curing at that temperature. The final infusible resin was hard and yellow.

Example 8

Using the same procedure and proportions as were used in Examples 1, 2, and 3, the mono-, di-, and tri-derivatives were reacted with formaldehyde in the presence of a catalytic reactant consisting of 0.1 mol (in 25% aqueous solution) of a tri(mono-carbinolureidomethyl) amine having the formula $N(CH_2NHCONCH_2OH)_3$. This aldehyde-reactable amine derivative is more fully described in my copending application Serial No. 409,018, filed August 30, 1941. The syrupy products cured alone at 135° C. Curing agents, such as chloroacetamide or alpha, beta-dichloropropionitrile accelerated the curing rates. Molding compounds containing 55% resin syrup (on solids basis) and 45% by weight of alpha flock exhibited excellent moldability and good flow and cure with or without the addition of 1% chloroacetamide.

Example 9

|  | Mol ratio (approx.) | Parts by weight |
|---|---|---|
| Aqueous mono-derivative (57% concentration) | 1 | 122.5 |
| Urea | 1 | 21.2 |
| Aqueous formaldehyde | 5 | 141.0 | were refluxed for 15 minutes. The syrupy product was clear while hot and precipitated out on cooling. It had a pH of 7.65 and a slow cure alone at 135° C. With chloroacetamide a good, accelerated cure was obtained.

Example 10

|  | Mol ratio (approx.) | Parts by weight |
|---|---|---|
| Aqueous di-derivative (55% concentration) | 1 | 75.7 |
| Urea | 1 | 11.1 |
| Aqueous formaldehyde | 7 | 103.5 |
| NaOH (dissolved in water) | 0.01 | 0.074 | were refluxed for 15 minutes to produce a syrup which was clear while hot and also on cooling. It had a pH of 8.0 and cured slowly at 135° C.

To 180 parts of syrup were added 0.75 part chloroacetamide. Sheets of 10 mil all-rag paper were dipped in this syrup, dried at 70° C. and laminated at 135° C. and 2000 pounds per square inch pressure for ½ hour. Excellent laminated products, which were light colored and translucent were obtained. Similar products were obtained by substituting an equimolar amount of the tri-derivative for the di-derivative and increasing the mol ratio of formaldehyde from 7 to 9.

Example 11

Example 10 was repeated using an equivalent amount of thiourea in place of the urea called for in the formulation of Example 10. The syrupy product had an excellent cure at 135° C. Molding compounds prepared from 55 parts syrup (on resin solids basis), 1 part chloroacetamide and 45 parts alpha flock had good moldability and flow and cured to hard, opaque masses. Comparable molding compounds were also prepared from the mono- and tri-derivatives.

Example 12

|  | Mol ratio (approx.) | Parts by weight |
|---|---|---|
| Aqueous di-derivative (66% concentration) | 1 | 75.7 |
| Aqueous formaldehyde | 6 | 88.8 |
| Para toluene sulfonamide | ½ | 15.8 |
| NaOH (in 3.5 parts water) | 0.01 | 0.074 | were refluxed for 15 minutes. The syrup was clear while hot but precipitated on cooling. At 135° C. it had a good, but prolonged, cure. With chloroacetamide, the cure was excellent with a long, tacky stage. A molding compound prepared from 55 parts syrup (on resin solids content) and 45 parts alpha flock was dried at 70° C. and molded at 135° C. and 6000# pressure for 5 minutes. The compound had excellent moldability, good flow and cure and the molded product had a hard surface and was light-colored.

(B)

|  | Mol ratio (approx.) | Parts by weight |
|---|---|---|
| Aqueous tri-derivative (68% concentration) | 1 | 73.0 |
| Para toluene sulfonamide | ¼ | 12.5 |
| Aqueous formaldehyde | 8 | 93.0 |
| NaOH (in 2.5 parts water) | 0.01 | 0.058 | were refluxed for 15 minutes. The syrup was clear while hot and also on cooling. At 135° C. it had a very slow and rather soft cure. With chloroacetamide the cure was accelerated but was still prolonged. An oven-dried molding compound containing 55 parts syrup (on solid basis), 1 part chloroacetamide and 45 parts alpha flock was molded at 135° C. and 6000# pressure for 5 minutes. This compound had excellent moldability and good flow and the molded product was very translucent, hard and shiny.

Example 13

|  | Mol ratio (approx.) | Parts by weight |
|---|---|---|
| Aqueous mono-derivative (57% concentration) | 1 | 122.5 |
| Phenol | 1 | 24.0 |
| Aqueous formaldehyde | 5 | 141.0 |
| NaOH (in 7 parts water) | 0.01 | 0.14 | were refluxed for 15 minutes to form a resinous syrup that was clear while hot and also on cooling. It had pH=8.3. At 135° C. it did not cure alone. With chloroacetamide, a slow cure was obtained.

A molding compound from 55 parts syrup (on resin solids content), 45 parts alpha flock and 2 parts chloroacetamide had excellent moldability and good flow. The molded product was slightly yellow. One part chloroacetamide was sufficient to impart good moldability and cure to such molding compositions prepared for resin syrups containing equivalent amounts of the di- and tri-derivatives.

Example 14

|  | Mol ratio (approx.) | Parts by weight |
|---|---|---|
| Aqueous di-derivative (66% concentration) | 1 | 75.7 |
| Melamine | 1 | 23.3 |
| Aqueous formaldehyde | 8 | 118.5 |
| NaOH (dissolved in 3.5 parts water) | 0.01 | 0.074 | were refluxed for 15 minutes. The resultant syrup was clear while hot and also on cooling and had a pH of 8.15. At 135° C. it cured alone. A molding compound prepared from 180 parts by weight of syrup and 60 parts alpha flock was oven dried at 70° C. and molded at 135° C. and 6000# pressure for 5 minutes. The compound had excellent flow and hard cure. The molded piece had a very light color and a shiny surface. This was considered a very good molding composition.

Example 15

|  | Mol ratio (approx.) | Parts by weight |
|---|---|---|
| Aqueous tri-derivative (68.5% concentration) | 1 | 73 |
| Dimethylol urea (containing 11% $H_2O$) | 14 | 276 |
| Aqueous $NH_3$ (28%) | ⅙ | 0.3 | were refluxed for 15 minutes. The syrup was clear while hot but precipitated on cooling and had a pH of 6.8. The cure alone at 135° C. was very slow and soft. With chloroacetamide an accelerated excellent cure was obtained.

A molding compound from 180 parts syrup (on resin solids basis) 59 parts alpha flock and 0.14 part chloroacetamide had good flow and cured to a translucent solid with a yellow cast.

Example 16

|  | Mol ratio (approx.) | Parts by weight |
|---|---|---|
| Aqueous mono-derivative (57% concentration) | 1 | 122.5 |
| Trimethylol melamine | 1 | 151.5 |
| Aqueous formaldehyde | 6 | 169.5 |
| Aqueous $NH_3$ (28%) | ⅙ | 0.75 | were refluxed for 15 minutes to obtain a resin syrup that was clear at elevated and room temperatures. It had an excellent cure alone and a very fast cure with alpha, beta-dichloropropionitrile. A molding compound from 55 parts of the syrup (based on the resin solids content thereof) and 45 parts alpha flock had an excellent hard cure and good flow and the molded piece was light-colored and shiny. Comparable results were obtained with resins obtained by using the di- and tri-derivatives in equivalent formulations.

Example 17

|  | Mol ratio (approx.) | Parts by weight |
|---|---|---|
| Aqueous tri-derivative (68.5% concentration) | 1 | 73.0 |
| Aqueous formaldehyde | 7 | 81.8 |
| Glycerine |  | 7.0 | were refluxed for 15 minutes. The syrupy product was clear while hot and also on cooling. At 135° C. it had a slow but good cure. Chloroacetamide greatly accelerated and hardened the cure.

Example 18

|  | Mol ratio (approx.) | Parts by weight |
|---|---|---|
| Aqueous di-derivative (51% concentration) | 1 | 122.5 |
| Aqueous formaldehyde | 3 | 84.8 |
| Butyl alcohol | 20% | 17.6 |
| NaOH (in water sol.) | 0.01 | 0.14 | were refluxed for 15 minutes to form a syrup which was clear while hot and also on cooling. It had a pH of 8.95 and a good cure at 135° C. A thin film of the syrup dried at 60–70° C. to a clear, hard resin.

Example 19

(A) The following:

|  | Mol ratio (approx.) | Parts by weight |
|---|---|---|
| Aqueous mono-derivative (57% concentration) | 1 | 63.7 |
| Aqueous formaldehyde | 3 | 42.3 |
| Diethyl malonate | 20% | 8.3 |
| NaOH (in water) | 0.01 | .07 | were refluxed for 15 minutes. The syrup product was clear while hot but changed to a white paste on cooling. At 135° C. the paste melted to a clear melt which was self-curing. The cure was prolonged but good.

(B) The following:

|  | Mol ratio (approx.) | Parts by weight |
|---|---|---|
| Aqueous di-derivative (66% concentration) | 1 | 75.7 |
| Aqueous formaldehyde | 5 | 74.2 |
| Diethyl malonate | 5% | 2.5 |
| NaOH (in water) | 0.01 | 0.07 | were refluxed for 15 minutes. The syrup was clear while hot and cloudy at room temperature. It had an excellent cure.

(C) The following:

|  | Mol ratio (approx.) | Parts by weight |
|---|---|---|
| Aqueous tri-derivative (68.5% concentration) | 1 | 36.5 |
| Aqueous formaldehyde | 7 | 40.9 |
| Diethyl malonate | 5% | 1.8 |
| NaOH (in water) | 0.01 | 0.03 | were refluxed for 15 minutes to form a syrup that was clear while hot and at room temperatures and which had a good cure at 135° C.

Example 20

|  | Mol ratio (approx.) | Parts by weight |
|---|---|---|
| Aqueous mono-derivative (57% concentration) | 1 | 63.7 |
| Aqueous formaldehyde | 3 | 42.3 |
| Aqueous NH₃ (28%) | 1.8 | 0.37 |
| Acetamide |  | 8.8 |

The above were refluxed together for 15 minutes. The syrup was clear while hot but precipitated on cooling. It had a pH of 7.8 and a slow but good cure at 135° C.

Example 21

(A) The following:

|  | Mol ratio (approx.) | Parts by weight |
|---|---|---|
| Aqueous di-derivative (66% concentration) | 1 | 75.7 |
| Acetamide |  | 5.6 |
| Aqueous formaldehyde | 5 | 74.2 |
| Aqueous NH₃ (28%) | ½ | 0.39 | were refluxed for 15 minutes. The resultant syrup having a pH of 7.3 was clear while hot and very thick and white on cooling. At 135° C. its cure was excellent with long, tacky stage. Chloroacetamide greatly accelerated and hardened the cure.

(B) The following:

|  | Mol ratio (approx.) | Parts by weight |
|---|---|---|
| Aqueous tri-derivative (68.5% concentration) | 1 | 36.5 |
| Aqueous formaldehyde | 7 | 40.9 |
| Acetamide | 5% | 1.8 |
| NaOH (in water) | 0.01 | 0.03 | were refluxed for 15 minutes. The resultant syrup was clear while hot and also on cooling. It had a pH of 7.4. At 135° C. it had a very slow cure which was accelerated to a hard cure by chloroacetamide.

Although in the above examples I have shown that satisfactory molding compounds can be made without use of curing agents or curing reactants, the use of such curing accelerators is recommended where molded pieces having maximum gloss and water resistance and minimum molding time are desired.

In producing any of these new condensation products, the choice of the aldehyde component is dependent largely upon economic considerations and the particular properties desired in the finished product. I prefer to use as the aldehyde reactant, formaldehyde or compounds engendering formaldehyde, e. g., paraformaldehyde, hexamethylene tetramine, etc. For some applications I may use, for instance, acetaldehyde, propionaldehyde, butyraldehyde, acrolein, methacrolein, crotonaldehyde, benzaldehyde, furfural, etc., mixtures thereof, or mixtures of formaldehyde (or compounds engendering formaldehyde) with such aldehydes. Various aldehyde-addition products may be used instead of aldehydes. Such products include the mono- and poly (N-carbinol) derivatives, more particularly the mono- and polymethylol derivatives, of urea, thiourea, selenourea, and iminourea, substituted ureas, thioureas, selenoureas, and iminoureas, amides of polycarboxylic acids, e. g., maleic, itaconic, fumaric, adipic, malonic, citric, phthalic, etc. I may also use with particularly good results, the methylol amino triazines, e. g., mono-, di-, tri-, tetra-, penta-, and hexa-methylol melamines; the methylol amino diazines, e. g., trimethylol 1,3,5-triamino pyridimine; the amino triazoles, e. g., dimethylol guanazole, etc. mixtures of these materials or mixtures of an aldehyde with such materials may also be used.

The ratio of aldehydic reactant to the melamine derivatives of this invention may be varied over a wide range but ordinarily is of the order corresponding to at least one mol of the aldehyde, or an equivalent amount of an aldehyde engendering- or addition products, for each mol of the melamine derivative. Thus, I may use for example from one to seven or eight mols, preferably from three to seven mols, of an aldehyde for each mol of the derivative.

In producing these various condensation products, dyes, pigments, plasticizer, mold lubricants, opacifiers, and various fillers (e. g., wood flour, glass fibers, asbestos, mineral wool, mica, cloth cuttings, etc.) may be compounded with the resin in accordance with conventional practice to provide various thermoplastic and thermosetting molding compositions.

The modified or unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc. are coated and impregnated with the resin, superimposed and thereafter united under heat and pressure. They may be used in the production of wire or baking enamels, for bonding or cementing together mica flakes to form a laminated mica article, for bonding together abrasive grains in the production of resin-bonded abrasive articles such as for instance as grindstones, sandpapers, etc. They also may be employed for treating cotton, linen, and other cellulosic materials in sheet or other form or as impregnants for electrical coils and for other electrically insulating applications.

What I claim as new and desire to secure by Letters Patent of the United States is:

1. A composition of matter comprising the reaction product of ingredients comprising an aldehyde and a carbamidomethyl derivative of a 2,4,6-triamino 1,3,5-triazine corresponding to the formula

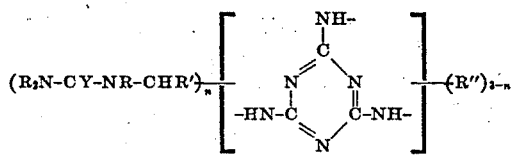

where Y is a member of the class consisting of oxygen and sulphur, at least one R represents hydrogen and the other (R)s represent members of the class consisting of hydrogen, monovalent hydrocarbon radicals and halogeno-hydrocarbon radicals, R' is a member of the class consisting of hydrogen and monovalent hydrocarbon radicals of not more than six carbon atoms, R" represents a member of the class consisting of hydrogen, monovalent hydrocarbon radicals and monovalent halogeno-hydrocarbon radicals, and n is an integer and is at least 1 and not more than 3.

2. A composition as in claim 1 wherein the aldehyde is formaldehyde.

3. A composition comprising the condensation product of ingredients comprising an aldehyde and an organic compound of the formula

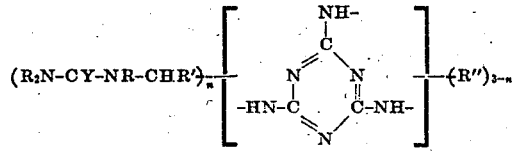

wherein Y is a member of the class consisting of oxygen and sulphur, R, R' and R" represent hydrogen, and n is an integer and is at least one but not more than 3.

4. A composition comprising a condensation product of ingredients comprising an aldehyde and an organic compound corresponding to the formula

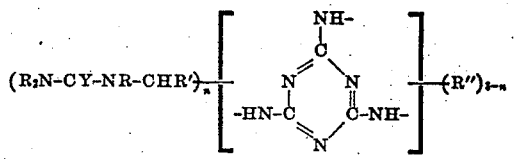

wherein Y represents oxygen, R, R' and R" represent hydrogen, and n is an integer and is at least one and not more than 3.

5. A composition comprising the condensation product of ingredients comprising an aldehyde and an organic compound corresponding to the formula

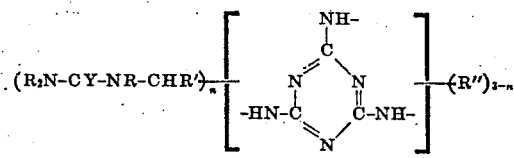

wherein Y represents a member of the class consisting of oxygen and sulphur, R and R' represent hydrogen, R" represents a monovalent hydrocarbon and radical, and n is an integer and is at least one but not more than 3.

6. A resinous composition comprising the product of reaction of ingredients comprising an organic compound having the general formula

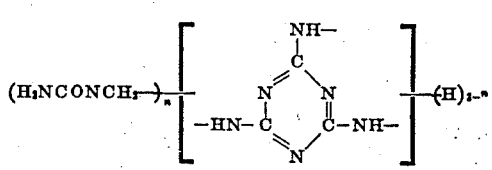

wherein n is an integer and is at least one but not more than 3, and formaldehyde.

7. A composition as in claim 1 wherein the reaction product is a urea-modified product of the stated components.

8. A heat-curable composition comprising the heat-convertible product of reaction of (1) a partial condensation product of ingredients comprising an aldehyde and an organic compound of the formula

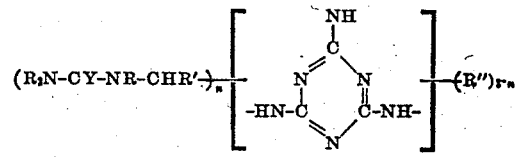

where Y is a member of the class consisting of oxygen and sulphur, at least one R represents hydrogen and the other (R)s represent members of the class consisting of hydrogen, monovalent hydrocarbon radicals and halogeno-hydrocarbon radicals, R' is a member of the class consisting of hydrogen and monovalent hydrocarbon radicals of not more than six carbon atoms, R" represents a member of the class consisting of hydrogen, monovalent hydrocarbon radicals and monovalent halogeno-hydrocarbon radicals, and n is an integer and is at least one but not more than 3, and (2) an alpha, beta-chloropropionitrile.

9. A product comprising the heat-cured composition of claim 8.

10. A composition comprising the reaction product of an aldehyde, an organic compound of the formula

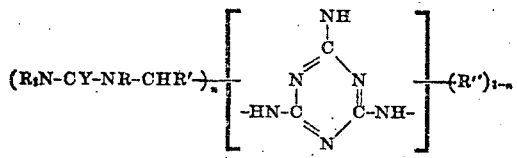

where Y is a member of the class consisting of oxygen and sulphur, at least one R represents hydrogen and the other (R)s represent members of the class consisting of hydrogen, monovalent hydrocarbon radicals and halogeno-hydrocarbon radicals, R' is a member of the class consisting of hydrogen and monovalent hydrocarbon radicals of not more than six carbon atoms, R'' represents a member of the class consisting of hydrogen, monovalent hydrocarbon radicals and monovalent halogeno-hydrocarbon radicals, and $n$ is an integer and is at least one but not more than 3 and an organic compound selected from the group consisting of substituted and unsubstituted mono-, di-, and tri-(carbamidomethyl) amines and substituted and unsubstituted mono-, di- and tri-(monocarbinolureidomethyl) amines.

11. The method of preparing new condensation products which comprises effecting reaction between ingredients comprising an aldehyde and an organic compound corresponding to the formula

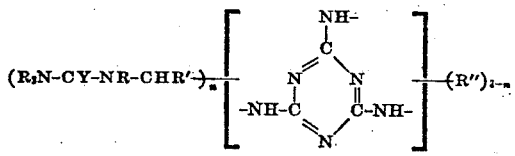

where Y is a member of the class consisting of oxygen and sulphur, at least one R represents hydrogen and the other (R)s represent members of the class consisting of hydrogen, monovalent hydrocarbon radicals and halogeno-hydrocarbon radicals, R' is a member of the class consisting of hydrogen and monovalent hydrocarbon radicals of not more than six carbon atoms, R'' represents a member of the class consisting of hydrogen, monovalent hydrocarbon radicals and monovalent halogeno-hydrocarbon radicals, and $n$ is an integer and is at least one but not more than 3.

12. The method which comprises condensing a mono-(N carbinol) urea with a melamine in aqueous solution to form a compound corresponding to the formula

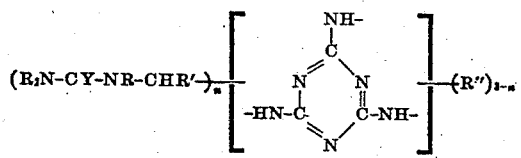

where Y is a member of the class consisting of oxygen and sulphur, at least one R represents hydrogen and the other (R)s represent members of the class consisting of hydrogen, monovalent hydrocarbon radicals and halogeno-hydrocarbon radicals, R' is a member of the class consisting of hydrogen and monovalent hydrocarbon radicals of not more than six carbon atoms, R'' represents a member of the class consisting of hydrogen, monovalent hydrocarbon radicals and monovalent halogeno-hydrocarbon radicals, and $n$ is an integer and is at least one but not more than 3, mixing said compound with ingredients comprising an aldehyde and heating said mixture to form a resinous composition comprising the reaction product of said compound and said aldehyde.

GAETANO F. D'ALELIO.

CERTIFICATE OF CORRECTION.

Patent No. 2,339,623.    January 18, 1944.

GAETANO F. D'ALELIO.

It is hereby certified that error appears in the printed specification of the above numbered patent requiring correction as follows: Page 1, second column, line 50, for "proplycar-" read -- propylcar- --; page 2, first column, line 25, for "aldye" read --aldehyde--; line 46, for "methytlol" read --methylol--; page 4, second column, line 6, in the table, last column thereof, for "70" read --73--; page 6, second column, line 65, for "pyridimine" read --pyrimidine--; page 7, second column, line 29, strike out "and" first occurrence; and that the said Letters Patent should be read with this correction therein that the same may conform to the record of the case in the Patent Office.

Signed and sealed this 18th day of April, A. D. 1944.

Leslie Frazer (Seal)    Acting Commissioner of Patents.